UNITED STATES PATENT OFFICE.

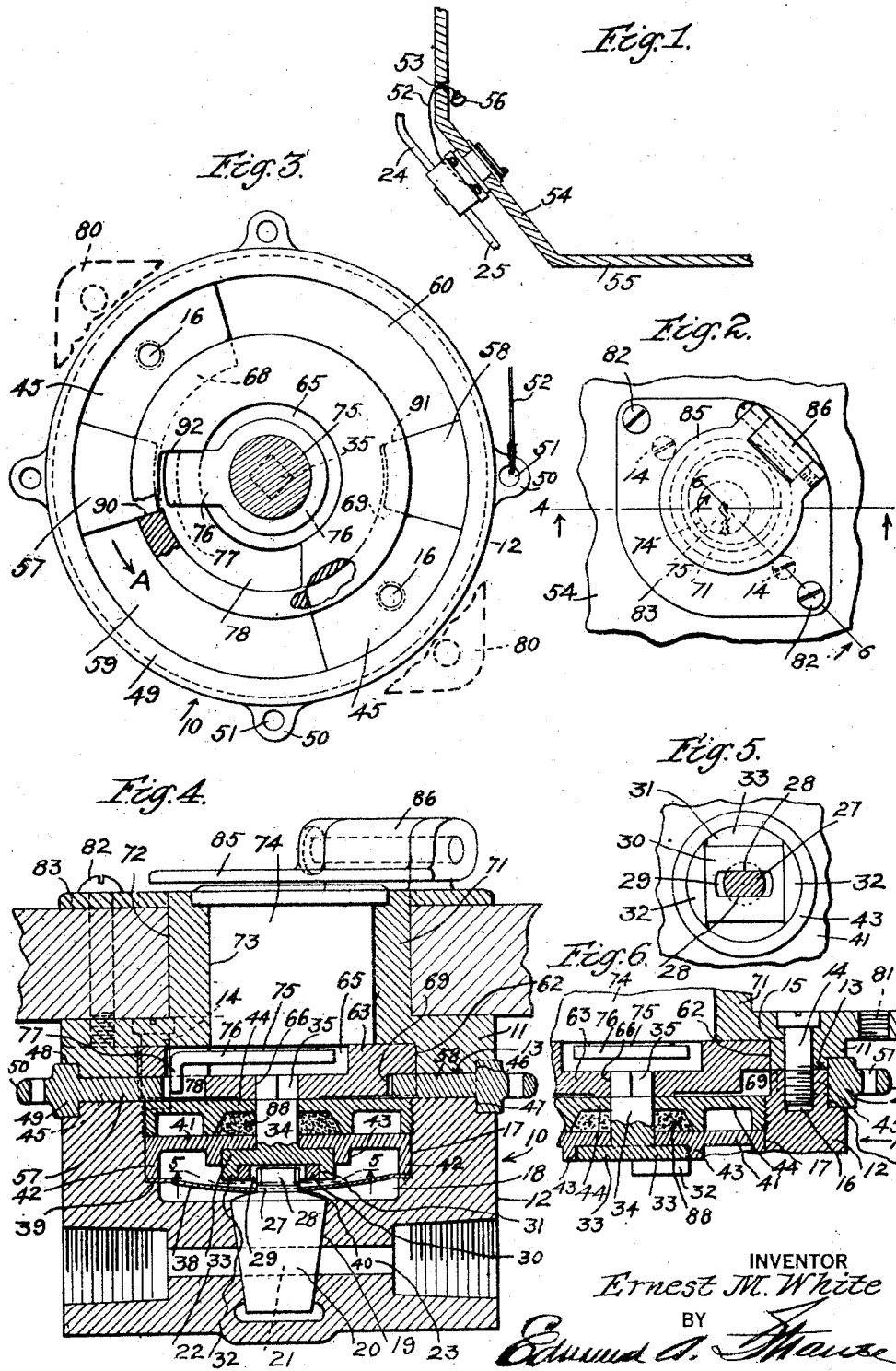

ERNEST M. WHITE, OF LOS ANGELES, CALIFORNIA, ASSIGNOR TO AUGUST J. KLINE AND DAVID L. KEIFFER, BOTH OF MILWAUKEE, WISCONSIN.

AUTOMOBILE-LOCK.

1,366,229.

Specification of Letters Patent.

Patented Jan. 18, 1921.

Application filed February 2, 1920. Serial No. 355,567.

*To all whom it may concern:*

Be it known that I, ERNEST M. WHITE, a citizen of the United States, residing at Los Angeles, in the county of Los Angeles and State of California, have invented new and useful Improvements in Automobile-Locks, of which the following is a specification.

My invention relates to automobile locks, and especially to that type of lock which serves to cut off the flow of fuel oil from the source of supply, to the carbureter of the engine, in order that the engine may not be started until a suitable key has been inserted into said lock to again open communication between the source of fuel oil supply and said carbureter.

It is the object of my invention to provide a simple, durable and efficient device which may be operated without the use of a key by exteriorly exposed mechanism, to cut out the supply of fuel oil to the carbureter, and which may not again be operated to a normal position until a suitable key has been used for that purpose, thus relieving the operator of the annoyance of utilizing a key for both operations, thereby effecting a great saving of time to the operator.

Another object of my invention is to provide a novel and efficient means for preventing the leakage of the fuel oil around the cut off valve.

A further object of my invention is to provide a universal joint for connecting the operating mechanism to the valve, in order that said valve will not require great pressure to hold it on its seat and may at all times rotate easily and true in its seat without undue wear, as well as to obviate the necessity of having a perfect alinement of the various parts.

Other objects will appear in the following description, will be pointed out in the claims and will be embodied in the accompanying drawings, in which:

Figure 1 is a sectional view through the flooring of the front of an automobile showing my device attached thereto in operative relation.

Fig. 2 is an enlarged plan view of my device shown attached to a fragment of the flooring.

Fig. 3 is a still larger plan view of the lower member of my device, parts being broken away and shown in section, in order to illustrate more clearly some of the working parts.

Fig. 4 is an enlarged section taken on the line 4—4 of Fig. 2, viewed in the direction indicated by the arrows.

Fig. 5 is a fragmental section taken on the line 5—5 of Fig. 4, viewed in the direction indicated by the arrows.

Fig. 6 is an enlarged fragmental section taken on the line 6—6 of Fig. 2.

In carrying out my invention I provide a cylindrical block 10, comprising an upper member 11 and a lower member 12, which are firmly secured together at 13 by means of the screws 14, which pass through suitable apertures 15 in the upper member 11 and are threaded into the apertures 16 formed in the lower member 12. The member 12 is provided with the centrally disposed bore 17 and the counter bore 18 of a smaller diameter than bore 17, and leading downwardly from bore 18 is the centrally disposed conical bore 19, which is adapted to receive the plug valve 20, which is provided with the transversely disposed bore 21 adapted to normally register with the transverse bores 22 and 23 formed in member 12. The bore 22 is connected to the fuel oil supply reservoir (not shown) by means of a pipe 24 and bore 23 is connected to the engine carbureter (not shown) by means of a pipe 25. It will be seen by the above described construction that when the plug 20 is in normal position as shown in Fig. 4, an uninterrupted flow of oil will pass through bores 22 and 23 to the carbureter and that when plug 21 is turned in its seat at an angle of substantially ninety degrees, the flow of the oil to the carbureter will cease.

The valve plug 20 is provided at its upper end with a short stem 27 which is flattened at 28 on oppositely disposed sides, said stem being adapted to engage in a slot 29 formed in a rectangular block 30. The block 30 is adapted to slide in a groove 31 formed between lugs 32 depending from a disk 33 which is provided with an upwardly extending stem 34, said stem being squared on its end at 35. By the foregoing described construction it will be seen that a universal joint is formed between stem 34 and plug valve 20, thereby permitting said plug valve to turn true in its seat without cramping, even though said stem 34 and plug valve 20 should be out of alinement.

In order that plug valve 20 may be held snugly in its seat, I provide a spring diaphragm 38, which rests upon a shoulder 39 formed at the intersection of bores 17 and 18 and is provided with a central aperture 40 through which stem 27 passes. The spring diaphragm 38 is held in place by means of a circular plate 41, which fits in bore 17 and is provided with a downwardly projecting peripheral flange 42, which rests against said diaphragm. The plate 41 is provided with a centrally disposed flange 43 adapted to surround disk 33, as clearly shown in Fig. 4 of the drawings. The bore 17 is threaded adjacent its upper end and is adapted to receive the threaded flanged plug 44, which serves to hold plate 41 and diaphragm 38 in place. At the extreme upper end of member 12 is formed a pair of oppositely disposed segmental lugs 45 adapted to act as stops for mechanism which will hereinafter be described.

The lower end of member 11 and the upper end of member 12 are turned down as at 46 and 47 to form a circular groove 48 in which is mounted for rotary reciprocating movement a ring 49, which is provided with a plurality of lugs 50 having perforations 51 therethrough. One end of a chain or cable 52 is secured to one of said lugs and passes through an opening 53 in the footboard 54 of the floor 55 of the automobile, and has secured to its opposite end a suitable knob 56. The ring 50 is provided with a pair of inwardly projecting oppositely disposed lugs 57 and 58 adapted to rest respectively in the spaces 59 and 60 formed between segmental lugs 45 and to be limited in their movement thereby.

The lower surface of member 11 is provided with a centrally disposed bore 62 in which is mounted a disk 63, which is adapted to rest upon the upper surface of threaded plug 44. The disk 63 is provided with a centrally disposed counterbore 65, and a centrally disposed squared aperture 66 adapted to receive the squared end 35 of the stem 34, and is also provided with oppositely disposed segmental grooves 68 and 69 formed in its peripheral surface, into which the inner ends of lugs 57 and 58 are adapted to project.

The member 11 is provided with an upwardly projecting eccentrically mounted boss 71, adapted to project through a hole 72 in the footboard 54, said boss being provided with a centrally disposed bore 73 adapted to receive an ordinary Yale lock 74, which is so mounted and secured firmly in bore 73 as to bring the key cylinder 75 thereof into concentric relation with the counterbore 65 of member 11. Secured to the lower end of key cylinder 75 and arranged in counter bore 65 is an arm 76 provided with a lug 77 adapted to project downwardly into a segmental slot 78 formed in disk 63.

The member 11 is provided with outwardly projecting ears 80 having threaded bores 81 for the reception of screws 82, which pass through holes in an escutcheon plate 83 and suitable bores in the footboard 54. By this construction it will be seen that the device may be firmly secured in proper position to the footboard of the automobile.

In order that the keyhole of lock 74 may be properly protected from dirt or other foreign material, a cap plate 85 is hinged at 86 to the escutcheon plate 83, as clearly shown in Figs. 1, 2 and 4 of the drawings.

The stem 34 is suitably packed by means of the felt or other suitable packing material 88, which surrounds said stem and is held in a suitable pocket formed on the lower surface of plug 44, as clearly shown in Fig. 4 of the drawings.

In the operation of the device, the operator pulls on the cable or chain 52, which causes ring 49 to rotate in the direction indicated by the arrow A. The lugs 57 and 58 on said ring engage with the walls 90 and 91 of segmental grooves 68 and 69 in disk 63, and cause said disk to rotate in the same direction and as disk 63 is connected to the valve 20 by means of the universal joint previously described, said valve is caused to rotate, thus cutting off communication between fuel oil passages 22 and 23. At the same time the wall 92 of segmental slot 78 engages with the downwardly projecting lug 77 formed on the key cylinder 75 and rotates said cylinder so that the lock key may be properly inserted when desired. The above mentioned parts are limited in their rotation to a quarter turn or ninety degrees, by means of the segmental lugs 45 as will be clearly seen. By this arrangement it is obvious that the ring 49 may be turned back in the opposite direction without effecting the cutoff plug valve 20, thereby making it impossible to again open the valve by exterior means. When it is desired to again open communication between fuel oil passages 22 and 23, the operator inserts his key into lock 74 and turns the cylinder 75 in the opposite direction to that indicated by arrow A, and thus brings the parts back to normal position, as shown in the several figures of the drawings.

What I claim is:

1. A device of the class described, comprising a body member provided with inlet and outlet ports, a plug valve mounted between said ports, a spring diaphragm mounted above said valve adapted to hold it in its seat, exposed operable means for moving said valve in one direction and a key operable mechanism for moving said valve in the opposite direction.

2. A device of the class described, comprising a body member provided with an inlet and an outlet port, a plug valve mounted between said ports, exposed means for turning said valve in one direction, a key operated means for turning said valve in the opposite direction, and a universal joint between said valve and valve operating means.

3. A device of the class described, comprising a body member provided with an inlet and an outlet port, a plug valve mounted between said ports, exterior means adapted to be operated by hand for closing said valve, interior means adapted to be operated by a key for opening said valve, a spring diaphragm mounted above and adapted to hold said valve in its seat, and a universal connection between said valve and valve operating means.

In witness that I claim the foregoing I have hereunto subscribed my name this 24th day of January, 1920.

ERNEST M. WHITE.